United States Patent
Taylor

(10) Patent No.: US 12,140,702 B1
(45) Date of Patent: Nov. 12, 2024

(54) LIDAR HAVING WAVELENGTH DISCRIMINATION

(71) Applicant: Allegro MicroSystems, LLC, Manchester, NH (US)

(72) Inventor: William P. Taylor, Amherst, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 18/465,296

(22) Filed: Sep. 12, 2023

(51) Int. Cl.
*G01S 7/481* (2006.01)
*G01S 7/4865* (2020.01)
*G01S 17/10* (2020.01)

(52) U.S. Cl.
CPC .......... *G01S 7/4814* (2013.01); *G01S 7/4816* (2013.01); *G01S 7/4865* (2013.01); *G01S 17/10* (2013.01)

(58) Field of Classification Search
CPC .... G01S 7/4814; G01S 7/4816; G01S 7/4865; G01S 17/10
See application file for complete search history.

(56) References Cited

U.S. PATENT DOCUMENTS

| | | |
|---|---|---|
| 6,760,145 B1 | 7/2004 | Taylor et al. |
| 6,778,728 B2 | 8/2004 | Taylor et al. |
| 6,894,823 B2 | 5/2005 | Taylor et al. |
| 6,989,921 B2 | 1/2006 | Bernstein et al. |
| 7,015,780 B2 | 3/2006 | Bernstein et al. |
| 7,160,753 B2 | 1/2007 | Williams, Jr. |
| 7,432,537 B1 | 10/2008 | Huntington |
| 7,504,053 B1 | 3/2009 | Alekel |
| 7,764,719 B2 | 7/2010 | Munroe et al. |
| 7,782,911 B2 | 8/2010 | Munroe et al. |
| 7,852,549 B2 | 12/2010 | Alekel et al. |
| 7,885,298 B2 | 2/2011 | Munroe |
| 7,994,421 B2 | 8/2011 | Williams et al. |

(Continued)

FOREIGN PATENT DOCUMENTS

| | | |
|---|---|---|
| TW | 201422772 | 6/2014 |
| WO | WO 2021/145906 A1 | 7/2021 |
| WO | WO 2022/046401 A1 | 3/2022 |

OTHER PUBLICATIONS

Bernstein et al., "Electromagnetically Actuated Mirror Arrays for Use in 3-D Optical Switching Applications;" Article in Journal of Microelectromechanical Systems, vol. 13, No. 3; Jun. 2004; 10 Pages.

(Continued)

*Primary Examiner* — Seung C Sohn
(74) *Attorney, Agent, or Firm* — DALY, CROWLEY, MOFFORD & DURKEE, LLP

(57) ABSTRACT

Methods and apparatus wavelength discrimination in a LiDAR system. An example embodiment, includes illuminating a field of view (FOV) with transmitted light having different wavelengths at different regions in the FOV, focusing incoming light with a lens of the LiDAR system, and diffracting the focused light from the lens with a diffraction optical element to generate signals having the different wavelengths to respective regions of a detector array, wherein each pixel position in the array corresponds to one of the different wavelengths and to a spatial location in the FOV. The data from the pixel array can be processed to discriminate any of the incoming light not transmitted by the LiDAR system.

30 Claims, 9 Drawing Sheets laser stripe and detector FOV projections at a particular azimuthal scan angle; laser and detector centroids are offset due to bistatic configuration

(56) References Cited

U.S. PATENT DOCUMENTS

| | | |
|---|---|---|
| 8,207,484 B1 | 6/2012 | Williams |
| 8,319,307 B1 | 11/2012 | Williams |
| 8,570,372 B2 | 10/2013 | Russell |
| 8,597,544 B2 | 12/2013 | Alekel |
| 8,630,036 B2 | 1/2014 | Munroe |
| 8,630,320 B2 | 1/2014 | Munroe et al. |
| 8,730,564 B2 | 5/2014 | Alekel |
| 8,743,453 B2 | 6/2014 | Alekel et al. |
| 8,760,499 B2 | 6/2014 | Russell |
| 8,766,682 B2 | 7/2014 | Williams |
| 8,853,639 B2 | 10/2014 | Williams, Jr. |
| 9,121,762 B2 | 9/2015 | Williams et al. |
| 9,197,233 B2 | 11/2015 | Gaalema et al. |
| 9,269,845 B2 | 2/2016 | Williams et al. |
| 9,368,933 B1 | 6/2016 | Nijjar et al. |
| 9,397,469 B1 | 7/2016 | Nijjar et al. |
| 9,447,299 B2 | 9/2016 | Schut et al. |
| 9,451,554 B1 | 9/2016 | Singh et al. |
| 9,466,745 B2 | 10/2016 | Williams et al. |
| 9,553,216 B2 | 1/2017 | Williams et al. |
| 9,591,238 B2 | 3/2017 | Lee et al. |
| 9,693,035 B2 | 6/2017 | Williams et al. |
| 9,759,602 B2 | 9/2017 | Williams |
| 9,804,264 B2 | 10/2017 | Villeneuve et al. |
| 9,810,775 B1 | 11/2017 | Welford et al. |
| 9,810,777 B2 | 11/2017 | Williams et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,835,490 B2 | 12/2017 | Williams et al. |
| 9,841,495 B2 | 12/2017 | Campbell et al. |
| 9,843,157 B2 | 12/2017 | Williams |
| 9,847,441 B2 | 12/2017 | Huntington |
| 9,857,468 B1 | 1/2018 | Eichenholz et al. |
| 9,869,754 B1 | 1/2018 | Campbell et al. |
| 9,874,635 B1 | 1/2018 | Eichenholz et al. |
| 9,897,687 B1 | 2/2018 | Campbell et al. |
| 9,905,992 B1 | 2/2018 | Welford et al. |
| 9,923,331 B2 | 3/2018 | Williams |
| 9,941,433 B2 | 4/2018 | Williams et al. |
| 9,958,545 B2 | 5/2018 | Eichenholz et al. |
| 9,989,629 B1 | 6/2018 | LaChapelle |
| 9,995,622 B2 | 6/2018 | Williams |
| 10,003,168 B1 | 6/2018 | Villeneuve |
| 10,007,001 B1 | 6/2018 | LaChapelle et al. |
| 10,012,732 B2 | 7/2018 | Eichenholz et al. |
| 10,061,019 B1 | 8/2018 | Campbell et al. |
| 10,088,559 B1 | 10/2018 | Weed et al. |
| 10,094,925 B1 | 10/2018 | LaChapelle |
| 10,114,111 B2 | 10/2018 | Russell et al. |
| 10,121,813 B2 | 11/2018 | Eichenholz et al. |
| 10,139,478 B2 | 11/2018 | Gaalema et al. |
| 10,169,678 B1 | 1/2019 | Sachdeva et al. |
| 10,169,680 B1 | 1/2019 | Sachdeva et al. |
| 10,175,345 B2 | 1/2019 | Rhee et al. |
| 10,175,697 B1 | 1/2019 | Sachdeva et al. |
| 10,191,155 B2 | 1/2019 | Curatu |
| 10,209,359 B2 | 2/2019 | Russell et al. |
| 10,211,592 B1 | 2/2019 | Villeneuve et al. |
| 10,211,593 B1 | 2/2019 | Lingvay et al. |
| 10,217,889 B2 | 2/2019 | Dhulla et al. |
| 10,218,144 B2 | 2/2019 | Munroe et al. |
| 10,241,198 B2 | 3/2019 | LaChapelle et al. |
| 10,254,388 B2 | 4/2019 | LaChapelle et al. |
| 10,254,762 B2 | 4/2019 | McWhirter et al. |
| 10,267,898 B2 | 4/2019 | Campbell et al. |
| 10,267,899 B2 | 4/2019 | Weed et al. |
| 10,267,918 B2 | 4/2019 | LaChapelle et al. |
| 10,275,689 B1 | 4/2019 | Sachdeva et al. |
| 10,295,668 B2 | 5/2019 | LaChapelle et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,338,199 B1 | 7/2019 | McWhirter et al. |
| 10,338,223 B1 | 7/2019 | Englard et al. |
| 10,340,651 B1 | 7/2019 | Drummer et al. |
| 10,345,437 B1 | 7/2019 | Russell et al. |
| 10,345,447 B1 | 7/2019 | Hicks |
| 10,348,051 B1 | 7/2019 | Shah et al. |
| 10,386,489 B2 | 8/2019 | Albelo et al. |
| 10,394,243 B1 | 8/2019 | Ramezani et al. |
| 10,401,480 B1 | 9/2019 | Gaalema et al. |
| 10,401,481 B2 | 9/2019 | Campbell et al. |
| 10,418,776 B2 | 9/2019 | Welford et al. |
| 10,445,599 B1 | 10/2019 | Hicks |
| 10,451,716 B2 | 10/2019 | Hughes et al. |
| 10,473,788 B2 | 11/2019 | Englard et al. |
| 10,481,605 B1 | 11/2019 | Maila et al. |
| 10,488,496 B2 | 11/2019 | Campbell et al. |
| 10,491,885 B1 | 11/2019 | Hicks |
| 10,502,831 B2 | 12/2019 | Eichenholz |
| 10,503,172 B2 | 12/2019 | Englard et al. |
| 10,509,127 B2 | 12/2019 | Englard et al. |
| 10,514,462 B2 | 12/2019 | Englard et al. |
| 10,520,602 B2 | 12/2019 | Villeneuve et al. |
| 10,523,884 B2 | 12/2019 | Lee et al. |
| 10,535,191 B2 | 1/2020 | Sachdeva et al. |
| 10,539,665 B1 | 1/2020 | Danziger et al. |
| 10,545,240 B2 | 1/2020 | Campbell et al. |
| 10,551,485 B1 | 2/2020 | Maheshwari et al. |
| 10,551,501 B1 | 2/2020 | LaChapelle |
| 10,557,939 B2 | 2/2020 | Campbell et al. |
| 10,557,940 B2 | 2/2020 | Eichenholz et al. |
| 10,571,567 B2 | 2/2020 | Campbell et al. |
| 10,571,570 B1 | 2/2020 | Paulsen et al. |
| 10,571,574 B1 | 2/2020 | Yavid |
| 10,578,720 B2 | 3/2020 | Hughes et al. |
| 10,591,600 B2 | 3/2020 | Villeneuve et al. |
| 10,591,601 B2 | 3/2020 | Hicks et al. |
| 10,606,270 B2 | 3/2020 | Englard et al. |
| 10,627,495 B2 | 4/2020 | Gaalema et al. |
| 10,627,512 B1 | 4/2020 | Hicks |
| 10,627,516 B2 | 4/2020 | Eichenholz |
| 10,627,521 B2 | 4/2020 | Englard et al. |
| 10,636,285 B2 | 4/2020 | Haas et al. |
| 10,641,874 B2 | 5/2020 | Campbell et al. |
| 10,663,564 B2 | 5/2020 | LaChapelle |
| 10,663,585 B2 | 5/2020 | McWhirter |
| 10,677,897 B2 | 6/2020 | LaChapelle et al. |
| 10,677,900 B2 | 6/2020 | Russell et al. |
| 10,684,360 B2 | 6/2020 | Campbell |
| 10,761,195 B2 * | 9/2020 | Donovan .............. G01S 17/931 |
| 10,914,839 B2 * | 2/2021 | Hartmann ............. G01S 17/42 |
| 11,156,716 B1 | 10/2021 | Yavid |
| 11,252,359 B1 | 2/2022 | Huntington et al. |
| 11,556,000 B1 | 1/2023 | Goldman et al. |
| 11,581,697 B2 | 2/2023 | Taylor et al. |
| 11,585,910 B1 | 2/2023 | Lee et al. |
| 11,600,654 B2 | 3/2023 | Stewart et al. |
| 11,601,733 B2 | 3/2023 | Cadugan |
| 11,619,914 B2 | 4/2023 | Myers et al. |
| 2018/0069367 A1 | 3/2018 | Villeneuve et al. |
| 2018/0284239 A1 | 10/2018 | LaChapelle et al. |
| 2018/0284240 A1 | 10/2018 | LaChapelle et al. |
| 2018/0284275 A1 | 10/2018 | LaChapelle |
| 2018/0284280 A1 | 10/2018 | Eichenholz et al. |
| 2019/0310368 A1 | 10/2019 | LaChapelle |
| 2021/0318439 A1 | 10/2021 | Yavid |
| 2022/0291358 A1 | 9/2022 | Taylor et al. |
| 2022/0334000 A1 | 10/2022 | Judkins, III et al. |
| 2022/0337770 A1 | 10/2022 | Judkins, III et al. |
| 2022/0406830 A1 | 12/2022 | Cadugan et al. |
| 2023/0051974 A1 | 2/2023 | Myers et al. |
| 2023/0103088 A1 | 3/2023 | Goldman et al. |
| 2023/0143755 A1 | 5/2023 | Yavid |
| 2023/0194685 A1 | 6/2023 | Lee et al. |

OTHER PUBLICATIONS

Taylor et al., "A High Fill Factor Linear Mirror Array for a Wavelength Selective Switch;" Journal of Micromechanics and Microengineering, vol. 14; Published Oct. 14, 2003; 6 Pages.

U.S. Appl. No. 18/330,555, filed Jun. 7, 2023, Dissanayake.

(56) References Cited

OTHER PUBLICATIONS

U.S. Appl. No. 18/184,242, filed Mar. 15, 2023, Munroe et al.
U.S. Appl. No. 17/809,990, filed Jun. 30, 2022, Quirk et al.
U.S. Appl. No. 17/663,896, filed May 18, 2022, Cadugan et al.
U.S. Appl. No. 17/660,221, filed Apr. 22, 2022, Filippini et al.
U.S. Appl. No. 17/659,035, filed Apr. 13, 2022, Cadugan et al.
U.S. Appl. No. 17/659,033, filed Apr. 13, 2022, Cadugan et al.
U.S. Appl. No. 17/656,981, filed Mar. 29, 2022, Myers et al.
U.S. Appl. No. 17/656,978, filed Mar. 29, 2022, Myers et al.
U.S. Appl. No. 17/656,977, filed Mar. 29, 2022, Myers et al.
U.S. Appl. No. 17/657,140, filed Mar. 20, 2022, Myers.
U.S. Appl. No. 17/653,881, filed Mar. 8, 2022, Keuleyan et al.
U.S. Appl. No. 17/651,250, filed Feb. 16, 2022, Marshall.
U.S. Appl. No. 17/648,702, filed Jan. 24, 2022, Lee et al.
U.S. Appl. No. 17/566,763, filed Dec. 31, 2021, Huntington et al.

* cited by examiner

FULL RETURN
NO INTERFERENCE $\lambda_0$  $\lambda_1$  $\lambda_2$

FULL RETURN
WITH INTERFERENCE $\lambda_0$  $\lambda_1$  $\lambda_2$

*FIG. 7A*  *FIG. 7B*

LIDAR HAVING WAVELENGTH DISCRIMINATION

BACKGROUND

As is known in the art, optical systems can detect light incident on a sensor. LIDAR systems, for example, transmit laser pulses that can be reflected by targets to generate signal return. In some environments, such as a cluster of autonomous vehicles, LiDAR systems may transmit signals of the same wavelength, which may result in signal from a different vehicle being received as signal return from vehicle that did not transmit the signal. That is, a first vehicle may transmit a signal that can be received, directly or by reflection, by a second vehicle that incorrectly interprets the signal as return from its transmitted signal, which may result in unsafe conditions.

SUMMARY

Example embodiments of the disclosure provide methods and apparatus for LiDAR systems, such as automotive LiDAR, with interference prevention, such as interference from other LiDAR systems. In embodiments, a splitter, such as a diffraction grating, and an optical receiver to direct signals to a detector, such as a two-dimensional (2D) pixel array, for wavelength coding. In embodiments, time coding, instead of, or in combination with, wavelength coding can be performed. Time coding can include circuitry to modulate and demodulate the received signal. In some embodiments, comparator arrays and thresholds can be used to create a digital bit at each pixel.

In one aspect, a method comprises: illuminating, by a first LiDAR system, a field of view (FOV) with pulses of transmitted light having different wavelengths at different regions in the FOV; focusing incoming light with a lens of the first LiDAR system; diffracting the focused light from the lens with a diffraction optical element to generate signals having the different wavelengths to respective regions of a detector array, wherein each pixel position in the array corresponds to one of the different wavelengths and to a spatial location in the FOV; and processing data from the pixel array to discriminate any of the incoming light coming from systems other than the first LiDAR system.

In one aspect, a method can further include one or more of the following features: the different regions of the FOV comprise different elevation angles for a slice of the FOV, the pixel array comprises a w by p two-dimensional array, wherein w is a wavelength index and p is a position index, the diffraction optical element comprises a diffraction grating, the diffraction optical element comprises a wavelength selective switch, a wavelength coding for the transmitted light includes wavelength and time, which corresponds to a range, masking pixels in the pixel array for which signal return is not expected based on the wavelength of the transmitted light for a given time, receiving light on the pixel array from an interferer, a wavelength coding for the transmitted light includes wavelength and time, and further including modifying the wavelength coding after detecting the interferer, a first one of the different wavelengths comprises 1550 nm, the pulses have a single wavelength, the pulses contain multiple wavelengths, employing multiple lasers to generate the different wavelengths, modulating the transmitted light with amplitude and/or frequency modulation, and/or generating a fault upon failing to receive an expected light at a given position in the pixel array.

In another aspect, a system comprises: a first LiDAR system configured to illuminate a field of view (FOV) with pulses of transmitted light having different wavelengths at different regions in the FOV; a lens to focus incoming light into the first LiDAR system; a diffraction optical element to diffract the focused light from the lens to generate signals having the different wavelengths to respective regions of a detector array, wherein each pixel position in the array corresponds to one of the different wavelengths and to a spatial location in the FOV; and a processor to process data from the pixel array to discriminate any of the incoming light coming from systems other than the first LiDAR system.

A system can further include one or more of the following features: the different regions of the FOV comprise different elevation angles for a slice of the FOV, the pixel array comprises a w by p two-dimensional array, wherein w is a wavelength index and p is a position index, the diffraction optical element comprises a diffraction grating, the diffraction optical element comprises a wavelength selective switch, a wavelength coding for the transmitted light includes wavelength and time, which corresponds to a range, the first LiDAR system is configured to mask pixels in the pixel array for which signal return is not expected based on the wavelength of the transmitted light for a given time, received light on the pixel array is from an interferer, a wavelength coding for the transmitted light includes wavelength and time, and the first LiDAR system is configured to modify the wavelength coding after detecting the interferer, a first one of the different wavelengths comprises 1550 nm, the pulses have a single wavelength, the pulses contain multiple wavelengths, multiple lasers to generate the different wavelengths, the first LiDAR system is configured to modulate the transmitted light with amplitude and/or frequency modulation, and/or the first LiDAR system is configured to generate a fault upon failing to receive an expected light at a given position in the pixel array.

BRIEF DESCRIPTION OF THE DRAWINGS

The foregoing features of this disclosure, as well as the disclosure itself, may be more fully understood from the following description of the drawings in which:

FIGS. 5A-5D show signal return on a detector array with and without interference for a scanning LiDAR system having wavelength discrimination;

FIGS. 7A and 7B show signal return having multiple wavelengths on a detector array with and without interference for a scanning LiDAR system having wavelength discrimination;

DETAILED DESCRIPTION

Figure 1:
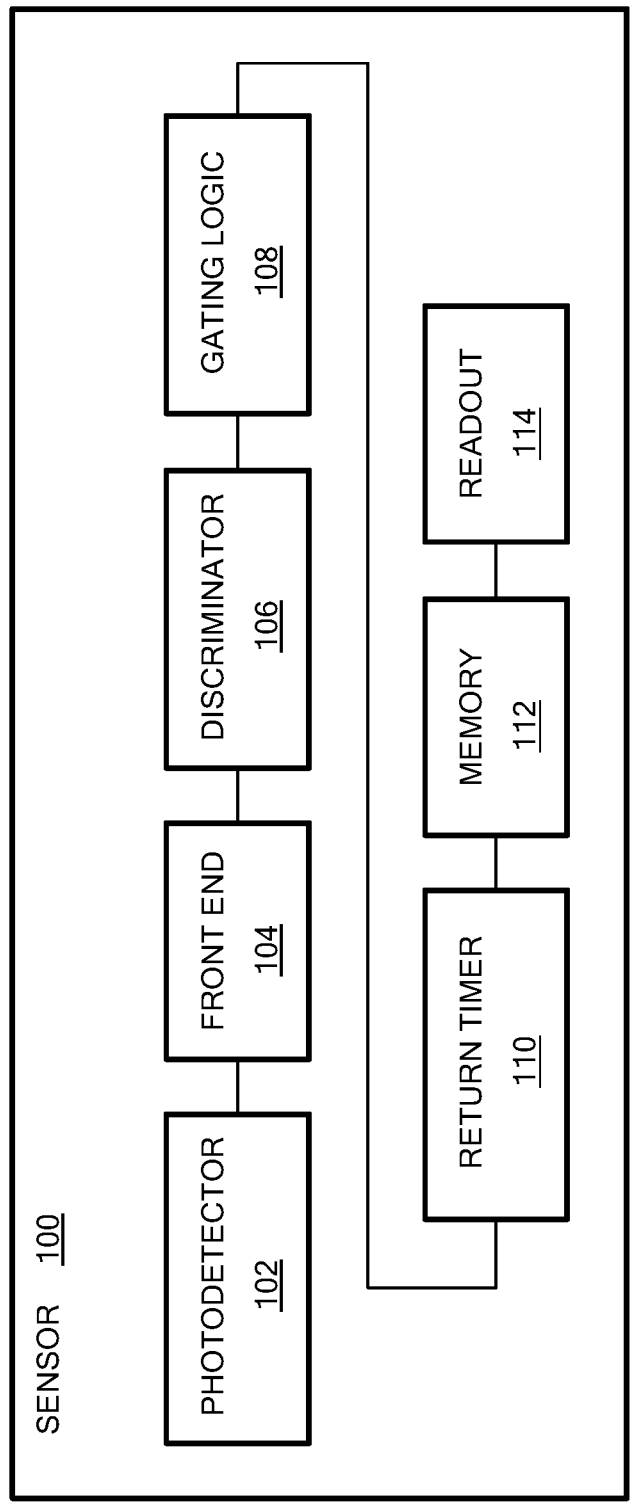
FIG. 1 is a block diagram of an example a LiDAR system having wavelength discrimination.

Prior to describing example embodiments of the disclosure some information is provided. Laser ranging systems can include laser radar (ladar), light-detection and ranging (lidar), and rangefinding systems, which are generic terms for the same class of instrument that uses light to measure the distance to objects in a scene. This concept is similar to radar, except optical signals are used instead of radio waves. Similar to radar, a laser ranging and imaging system emits a pulse toward a particular location and measures the return echoes to extract the range.

As used herein, the term "light" refers to electromagnetic radiation spanning the ultraviolet, visible, and infrared wavebands, of any wavelength between 100 nm and 3,000 nm.

Laser ranging systems generally work by emitting a laser pulse and recording the time it takes for the laser pulse to travel to a target, reflect, and return to a photoreceiver. The laser ranging instrument records the time of the outgoing pulse—either from a trigger or from calculations that use measurements of the scatter from the outgoing laser light—and then records the time that a laser pulse returns. The difference between these two times is the time of flight to and from the target. Using the speed of light, the round-trip time of the pulses is used to calculate the distance to the target.

Lidar systems may scan the beam across a target area to measure the distance to multiple points across the field of view, producing a full three-dimensional range profile of the surroundings. More advanced flash lidar cameras, for example, contain an array of detector elements, each able to record the time of flight to objects in their field of view.

When using light pulses to create images, the emitted pulse may intercept multiple objects, at different orientations, as the pulse traverses a 3D volume of space. The echoed laser-pulse waveform contains a temporal and amplitude imprint of the scene. By sampling the light echoes, a record of the interactions of the emitted pulse is extracted with the intercepted objects of the scene, allowing an accurate multi-dimensional image to be created. To simplify signal processing and reduce data storage, laser ranging and imaging can be dedicated to discrete-return systems, which record only the time of flight (TOF) of the first, or a few, individual target returns to obtain angle-angle-range images. In a discrete-return system, each recorded return corresponds, in principle, to an individual laser reflection (i.e., an echo from one particular reflecting surface, for example, a tree, pole or building). By recording just a few individual ranges, discrete-return systems simplify signal processing and reduce data storage, but they do so at the expense of lost target and scene reflectivity data. Because laser-pulse energy has significant associated costs and drives system size and weight, recording the TOF and pulse amplitude of more than one laser pulse return per transmitted pulse, to obtain angle-angle-range-intensity images, increases the amount of captured information per unit of pulse energy. All other things equal, capturing the full pulse return waveform offers significant advantages, such that the maximum data is extracted from the investment in average laser power. In full-waveform systems, each backscattered laser pulse received by the system is digitized at a high sampling rate (e.g., 500 MHz to 1.5 GHZ). This process generates digitized waveforms (amplitude versus time) that may be processed to achieve higher-fidelity 3D images.

Of the various laser ranging instruments available, those with single-element photoreceivers generally obtain range data along a single range vector, at a fixed pointing angle. This type of instrument—which is, for example, commonly used by golfers and hunters—either obtains the range (R) to one or more targets along a single pointing angle or obtains the range and reflected pulse intensity (I) of one or more objects along a single pointing angle, resulting in the collection of pulse range-intensity data, $(R,I)_i$, where i indicates the number of pulse returns captured for each outgoing laser pulse.

More generally, laser ranging instruments can collect ranging data over a portion of the solid angles of a sphere, defined by two angular coordinates (e.g., azimuth and elevation), which can be calibrated to three-dimensional (3D) rectilinear cartesian coordinate grids; these systems are generally referred to as 3D lidar and ladar instruments. The terms "lidar" and "ladar" are often used synonymously and, for the purposes of this discussion, the terms "3D lidar," "scanned lidar," or "lidar" are used to refer to these systems without loss of generality. 3D lidar instruments obtain three-dimensional (e.g., angle, angle, range) data sets. Conceptually, this would be equivalent to using a rangefinder and scanning it across a scene, capturing the range of objects in the scene to create a multi-dimensional image. When only the range is captured from the return laser pulses, these instruments obtain a 3D data set (e.g., angle, angle, range)$_n$, where the index n is used to reflect that a series of range-resolved laser pulse returns can be collected, not just the first reflection.

Some 3D lidar instruments are also capable of collecting the intensity of the reflected pulse returns generated by the objects located at the resolved (angle, angle, range) objects in the scene. When both the range and intensity are recorded, a multi-dimensional data set [e.g., angle, angle, (range-intensity)] is obtained. This is analogous to a video camera in which, for each instantaneous field of view (FOV), each effective camera pixel captures both the color and intensity of the scene observed through the lens. However, 3D lidar systems, instead capture the range to the object and the reflected pulse intensity.

Lidar systems can include different types of lasers, including those operating at different wavelengths, including those that are not visible (e.g., those operating at a wavelength of 840 nm or 905 nm), and in the near-infrared (e.g., those operating at a wavelength of 1064 nm or 1550 nm), and the thermal infrared including those operating at wavelengths known as the "eyesafe" spectral region (i.e., generally those operating at a wavelength beyond 1300-nm), where ocular damage is less likely to occur. Lidar transmitters are generally invisible to the human eye. However, when the wavelength of the laser is close to the range of sensitivity of the human eye—roughly 350 nm to 730 nm—the energy of the laser pulse and/or the average power of the laser must be lowered such that the laser operates at a wavelength to which the human eye is not sensitive. Thus, a laser operating at, for example, 1550 nm, can-without causing ocular damage-generally have 200 times to 1 million times more laser pulse energy than a laser operating at 840 nm or 905 nm.

It is understood that while example embodiments of the disclosure are shown and described in conjunction with LiDAR systems, it is understood that any suitable wavelengths and wavelength schemes can be used to meet the needs of a particular application.

One challenge for a lidar system is detecting poorly reflective objects at long distance, which requires transmitting a laser pulse with enough energy that the return signal-reflected from the distant target—is of sufficient magnitude to be detected. To determine the minimum required laser transmission power, several factors must be considered. For instance, the magnitude of the pulse returns scattering from the diffuse objects in a scene is proportional to their range and the intensity of the return pulses generally scales with distance according to $1/R^4$ for small objects and $1/R^2$ for larger objects; yet, for highly-specularly reflecting objects (i.e., those objects that are not diffusively-scattering objects), the collimated laser beams can be directly reflected back, largely unattenuated. This means that-if the laser pulse is transmitted, then reflected from a target 1 meter away—it is possible that the full energy (J) from the laser pulse will be reflected into the photoreceiver; but-if the laser pulse is transmitted, then reflected from a target 333 meters away—it is possible that the return will have a pulse with energy approximately $10^{12}$ weaker than the transmitted energy. To provide an indication of the magnitude of this scale, the 12 orders of magnitude ($10^{12}$) is roughly the equivalent of: the number of inches from the earth to the sun, 10× the number of seconds that have elapsed since Cleopatra was born, or the ratio of the luminous output from a phosphorescent watch dial, one hour in the dark, to the luminous output of the solar disk at noon.

In many cases of lidar systems highly-sensitive photoreceivers are used to increase the system sensitivity to reduce the amount of laser pulse energy that is needed to reach poorly reflective targets at the longest distances required, and to maintain eyesafe operation. Some variants of these detectors include those that incorporate photodiodes, and/or offer gain, such as avalanche photodiodes (APDs) or single-photon avalanche detectors (SPADs). These variants can be configured as single-element detectors, segmented-detectors, linear detector arrays, or area detector arrays. Using highly sensitive detectors such as APDs or SPADs reduces the amount of laser pulse energy required for long-distance ranging to poorly reflective targets. The technological challenge of these photodetectors is that they must also be able to accommodate the incredibly large dynamic range of signal amplitudes.

As dictated by the properties of the optics, the focus of a laser return changes as a function of range; as a result, near objects are often out of focus. Furthermore, also as dictated by the properties of the optics, the location and size of the "blur"—i.e., the spatial extent of the optical signal-changes as a function of range, much like in a standard camera. These challenges are commonly addressed by using large detectors, segmented detectors, or multi-element detectors to capture all of the light or just a portion of the light over the full-distance range of objects. It is generally advisable to design the optics such that reflections from close objects are blurred, so that a portion of the optical energy does not reach the detector or is spread between multiple detectors. This design strategy reduces the dynamic range requirements of the detector and prevents the detector from damage.

Acquisition of the lidar imagery can include, for example, a 3D lidar system embedded in the front of car, where the 3D lidar system, includes a laser transmitter with any necessary optics, a single-element photoreceiver with any necessary dedicated or shared optics, and an optical scanner used to scan ("paint") the laser over the scene. Generating a full-frame 3D lidar range image—where the field of view is 20 degrees by 60 degrees and the angular resolution is 0.1 degrees (10 samples per degree)—requires emitting 120,000 pulses [(20*10*60*10)=120,000)]. When update rates of 30 frames per second are required, such as is required for automotive lidar, roughly 3.6 million pulses per second must be generated and their returns captured.

There are many ways to combine and configure the elements of the lidar system-including considerations for the laser pulse energy, beam divergence, detector array size and array format (single element, linear, 2D array), and scanner to obtain a 3D image. If higher power lasers are deployed, pixelated detector arrays can be used, in which case the divergence of the laser would be mapped to a wider field of view relative to that of the detector array, and the laser pulse energy would need to be increased to match the proportionally larger field of view. For examplecompared to the 3D lidar above—to obtain same-resolution 3D lidar images 30 times per second, a 120,000-element detector array (e.g., 200×600 elements) could be used with a laser that has pulse energy that is 120,000 times greater. The advantage of this "flash lidar" system is that it does not require an optical scanner; the disadvantages are that the larger laser results in a larger, heavier system that consumes more power, and that it is possible that the required higher pulse energy of the laser will be capable of causing ocular damage. The maximum average laser power and maximum pulse energy are limited by the requirement for the system to be eyesafe.

As noted above, while many lidar system operate by recording only the laser time of flight and using that data to obtain the distance to the first target return (closest) target, some lidar systems are capable of capturing both the range and intensity of one or multiple target returns created from each laser pulse. For example, for a lidar system that is capable of recording multiple laser pulse returns, the system can detect and record the range and intensity of multiple returns from a single transmitted pulse. In such a multi-pulse lidar system, the range and intensity of a return pulse from a from a closer-by object can be recorded, as well as the range and intensity of later reflection(s) of that pulse-one(s) that moved past the closer-by object and later reflected off of more-distant object(s). Similarly, if glint from the sun reflecting from dust in the air or another laser pulse is detected and mistakenly recorded, a multi-pulse lidar system allows for the return from the actual targets in the field of view to still be obtained.

The amplitude of the pulse return is primarily dependent on the specular and diffuse reflectivity of the target, the size of the target, and the orientation of the target. Laser returns from close, highly-reflective objects, are many orders of magnitude greater in intensity than the intensity of returns from distant targets. Many lidar systems require highly sensitive photodetectors, for example avalanche photodiodes (APDs), which along with their CMOS amplification circuits. So that distant, poorly-reflective targets may be detected, the photoreceiver components are optimized for high conversion gain. Largely because of their high sensitivity, these detectors may be damaged by very intense laser pulse returns.

For example, if an automotive equipped with a front-end lidar system were to pull up behind another car at a stoplight, the reflection off of the license plate may be significant-perhaps $10^{12}$ higher than the pulse returns from targets at the distance limits of the lidar system. When a bright laser pulse is incident on the photoreceiver, the large current flow through the photodetector can damage the detector, or the large currents from the photodetector can cause the voltage to exceed the rated limits of the CMOS electronic amplification circuits, causing damage. For this reason, it is generally advisable to design the optics such that the reflections from close objects are blurred, so that a portion of the optical energy does not reach the detector or is spread between multiple detectors.

However, capturing the intensity of pulses over a larger dynamic range associated with laser ranging may be challenging because the signals are too large to capture directly. One can infer the intensity by using a recording of a bit-modulated output obtained using serial-bit encoding obtained from one or more voltage threshold levels. This technique is often referred to as time-over-threshold (TOT) recording or, when multiple-thresholds are used, multiple time-over-threshold (MTOT) recording.

FIG. 1 shows an example LiDAR time-of-flight system 100 having wavelength discrimination in accordance with example embodiments of the disclosure. The system 100 includes photodetectors including a photodiode 102 array to detect photons reflected from a target illuminated with transmitted energy. A front-end circuit 104, which may include an amplifier for example, receives a current pulse generated by an optical pulse on the photodiode 102 and converts the current signal into an output, for example, an output voltage pulse. A discriminator circuit 106, such as a voltage discriminator, can determine if the current pulse, or its representation after signal conversion by the front-end circuit, is above one or more thresholds. Gating logic 108 receives an output from the discriminator 106 to match received signals with transmitted signals, for example. A return timer circuit 110, which can include a time-to-digital converter (TDC) for generating time-stamps, can determine the time from signal transmission to signal return so that a distance from the sensor to the target can be determined based on so-called time of flight. A memory 112 can store signal information, such as time of flight, time over threshold, and the like. A readout circuit 114—enables information to be read from the sensor.

A data processing and calibration circuit may be inserted between the memories 112 and the readout 114 which may perform any number of data correction or mapping functions. For example, the circuit may compare timing return information to timing reference information and convert timing return information into specific range information. Additionally, the circuit may correct for static or dynamic errors using calibration and correction algorithms. Other possible functions include noise reduction based on multi-return data or spatial correlation or objection detection. A possible mapping function may be to reshape the data into point-cloud data or to include additional probability data of correct measurement values based on additionally collected information from the sensor.

Figure 2:
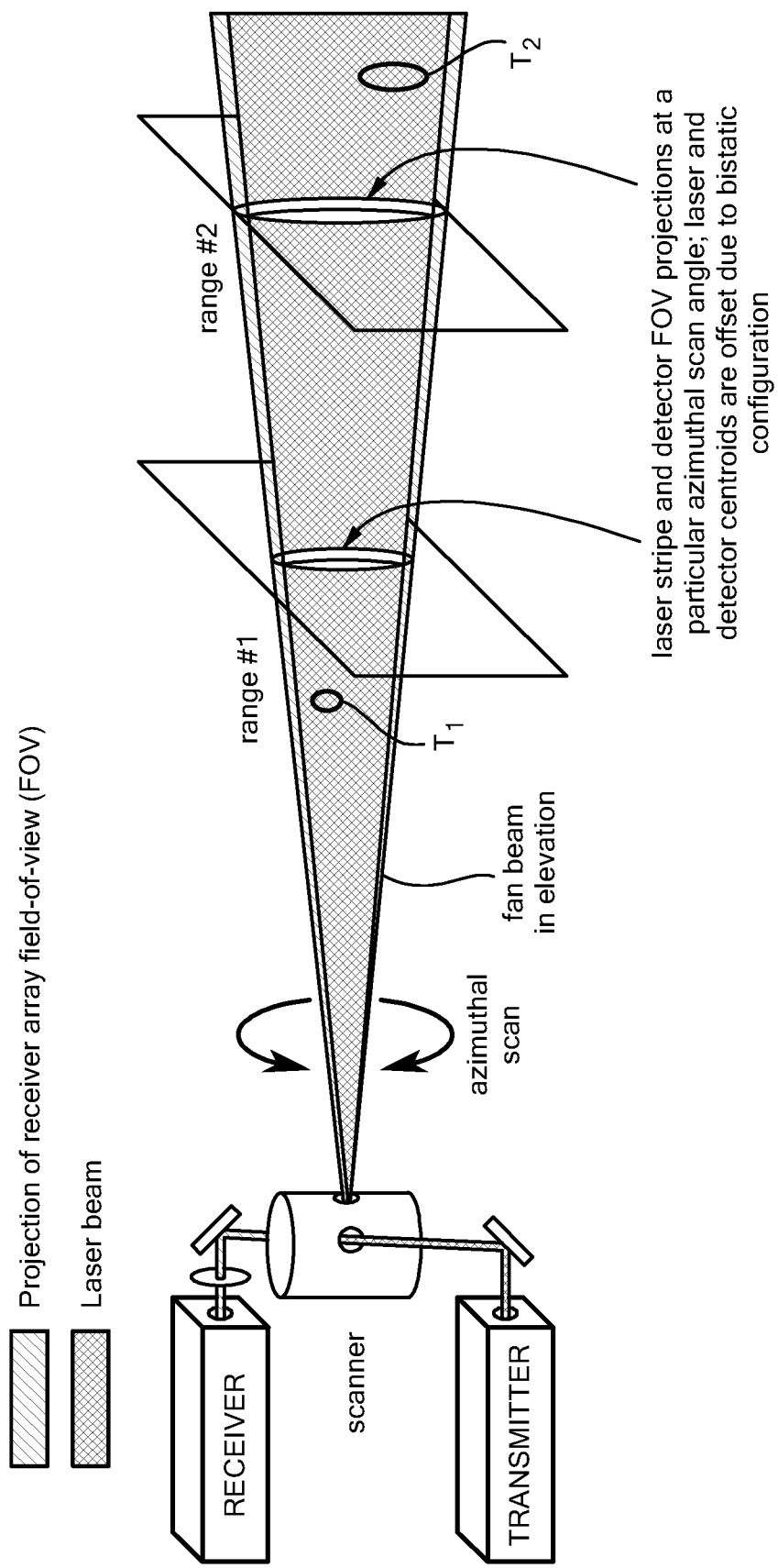
FIG. 2 is a schematic representation of an example scanning LiDAR system having wavelength discrimination.

FIG. 2 shows an example scanning lidar system having wavelength discrimination in accordance with illustrative embodiments of the disclosure. As can be seen, centroids of the laser fan-beam and the projection of the receiver's FOV are offset. The receiver's FOV overlaps the fan-beam in order to see the projected laser stripe. It is understood that the object is not seen unless the laser paints the object with a stripe, and that stripe is directly in the straight beam path of the laser. Thus, the offset and substantial parallelism of the transmit and receive paths is a geometric characteristic of this type of 1D scanned lidar system.

In the illustrated embodiment, a fan beam is transmitted, which may be vertical in elevation, at a given azimuth angle. The system can scan a volume with sequential fan beams at a given azimuth spacing. First and second targets T1, T2 at a respective ranges can be detected for a given azimuth angle for some range of elevation.

Figure 3:
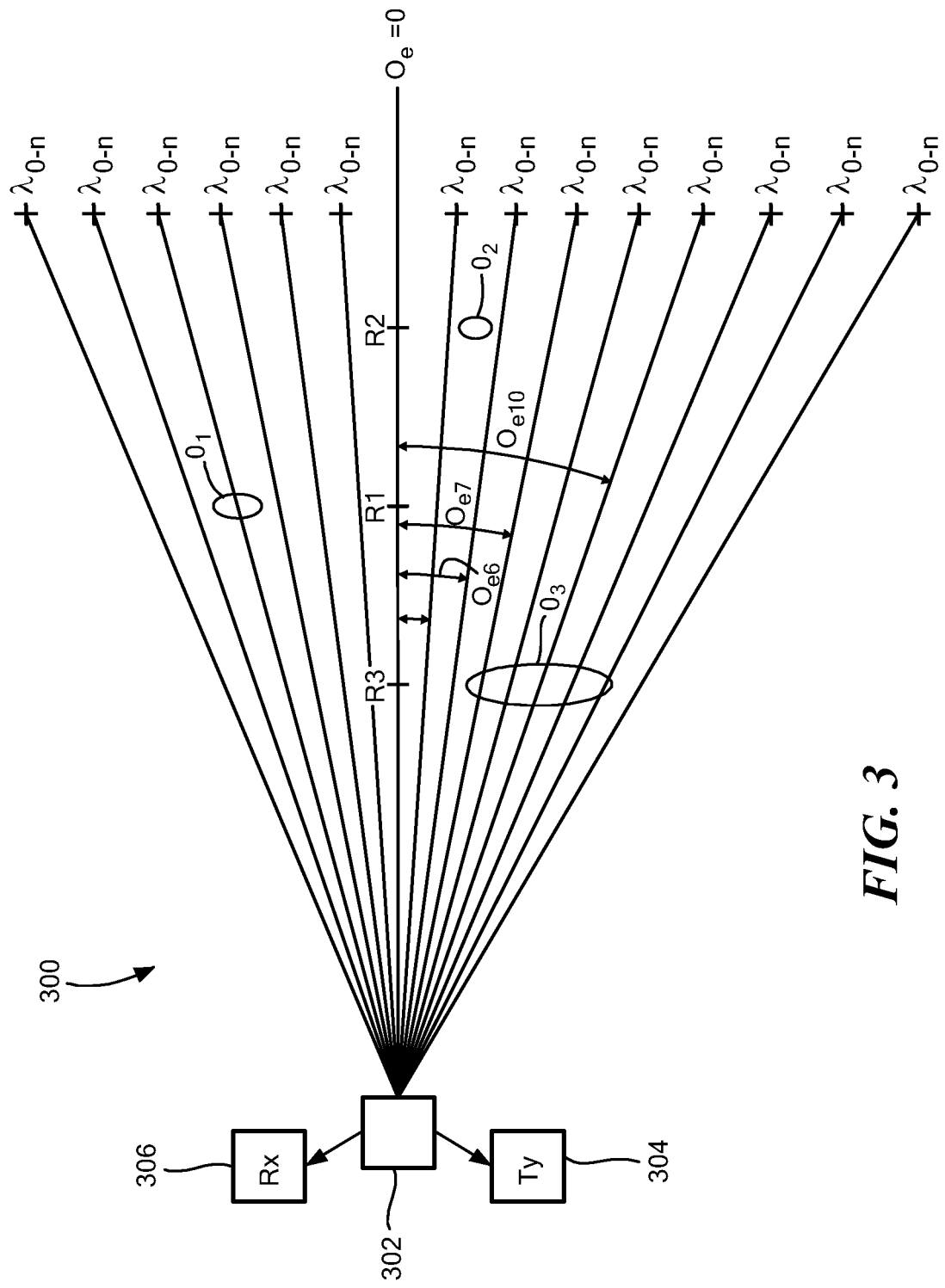
FIG. 3 is a schematic representation of a part of a receiver of a scanning LiDAR system having wavelength discrimination.

FIG. 3 shows an example scanning LiDAR system 300 having a scanner 302 coupled to a transmitter module 304 and a receiver module 306. For a given scan slice at an azimuth angle, the transmitter 304 can emit pulses each of which can contain wavelengths of AO-n for a field of view (FOV). In some embodiments, each pulse may have a unique wavelength where one or more lasers may generate signals from a selected number of wavelengths. For example, the wavelengths AO-n of the emitted pulses may be one of five different possible wavelengths (n=5) that can be transmitted. In addition, multiple pulses may be transmitted until the wavelength changes. In other embodiments, pulses may contain multiple wavelength signals (any combination of wavelengths AO-n), as described more fully below.

Signal return is generated by the transmitted light being reflected by a target in the FOV. The signal return has a wavelength corresponding to the wavelength of the transmitted pulse. The angle of the signal return corresponds to the respective elevation angle $\theta_{ex}$ of the target that generates the signal return. That is, a laser pulse hits a target that reflects light that follows the same path back to the scanner 302 as the transmitted pulse. As described more fully below, the location of the signal return on a detector array corresponds to the elevation angle of the target in the FOV slice.

It is understood that Doppler and other effects may change the frequency of the signal return. It is understood that any practical number of wavelengths, pulses, spacing, resolution, etc., can be used to meet the needs of a particular application.

Figure 4:
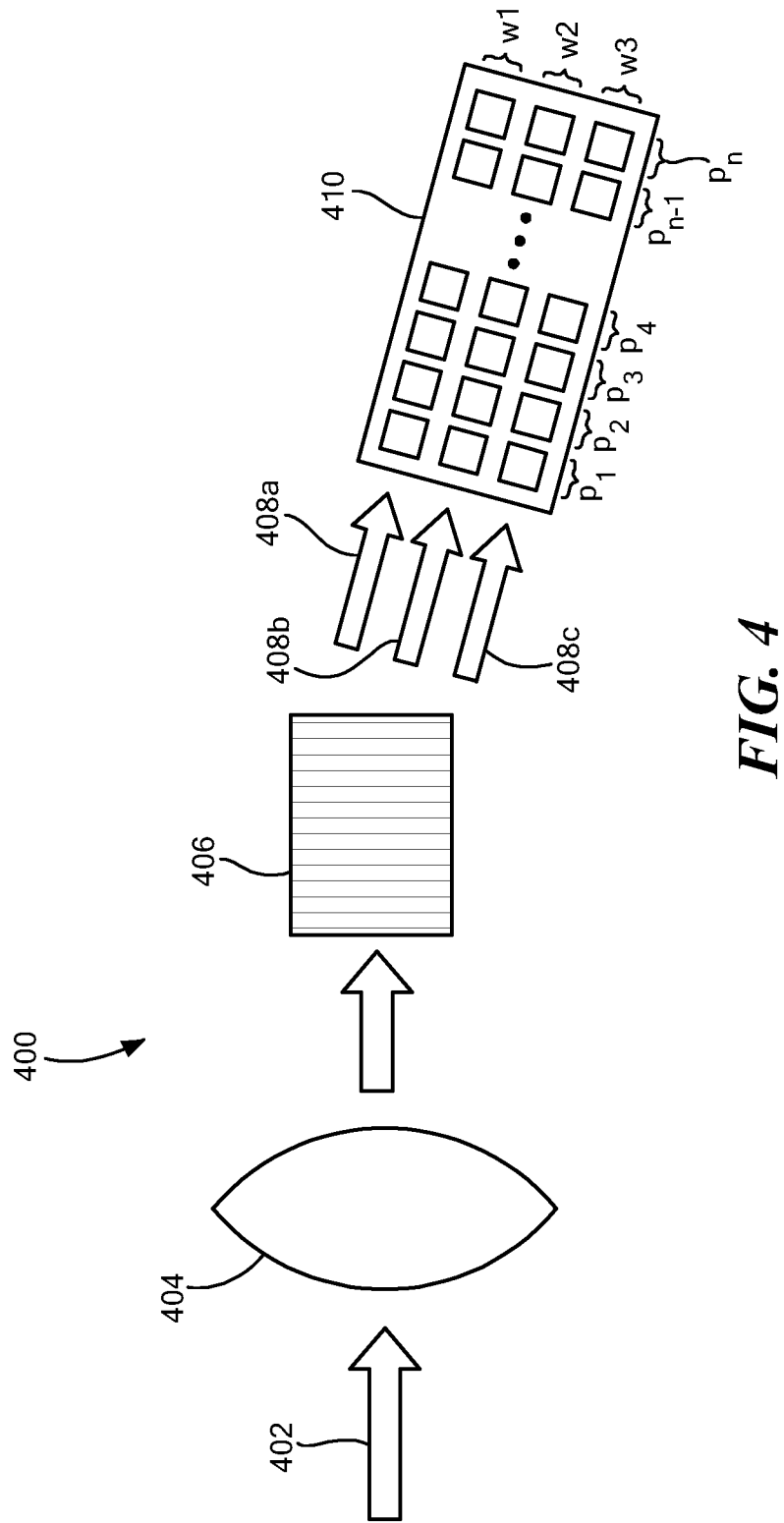
FIG. 4 is a schematic representation of an elevation scan of a FOV with different wavelengths for a scanning LiDAR system having wavelength discrimination.

FIG. 4 shows an example LiDAR system 400 having wavelength discrimination of incoming light to reduce or prevent cross talk among multiple vehicles, for example. Light from a laser source (not shown) is reflected off of another vehicle or obstruction, such as a building, another vehicle, a pedestrian, etc.) and is received by the lidar system as incoming light 402. The incoming light 402 is focused or directed by a lens 404 to an optical element 406, such as a diffraction grating or prism, which causes light of different wavelengths 408a,b,c to be directed to different physical positions on a detector array 410, shown as a linear pixel array. In the illustrated embodiment, the detector array 410 comprises a w by p array, where w=3 so that each of w1, w2, w3 each corresponds to a different one of the three wavelengths 408a,b,c, and p=n for some discrete number of positions corresponding to respective elevation angles in the FOV slice. The long p-axis of the detector array 410 is achieved, for example, by scanning slices in a FOV, to allow processing of optical data across a wider scene or field of view.

In the illustrated embodiment, incoming light 402 for a slice may contain multiple wavelengths since signal return is generated by one or more targets reflecting different ones of the transmitted wavelength signals at different times. In one embodiment, light is centered at 1550 nm with other wavelengths of 1525 and 1575 nm. The output of the diffraction optical element 406 focuses different wavelength light on different rows (w1, w2, w3) of the w×p linear array 410. Based on the wavelength transmission schedule over each slice, a LiDAR system can discriminate signals from other LiDAR systems, which can be considered as interferers that may also emit light at the same wavelengths. In embodiments, each vehicle can have a different coding to reduce or eliminate interfering system signals and increase safety.

It is understood that any practical number of wavelengths can be used to achieve coding schemes to meet the needs of a particular embodiment. In addition, it is understood that the detector array can have any practical length by width dimensions to effect any practical coding scheme.

In embodiments, coding may dynamically change over time such that during one time period the light is expected on certain pixels of the detector array and at a second time period light is expected on different pixels of the detector array, and so on.

FIG. 5A shows an example w (wavelength) by p (slice position) array shown as having three wavelengths λ0, λ1, λ2, and n positions (p1-n) for a "full" return, e.g., a wall in the FOV slice reflects each transmitted pulse. Each "X" indicates signal return in the given pixel in the array. In the illustrated embodiment, there are no interferers, i.e., no signals are received other than signal return from pulses generated by the LiDAR system. The pattern of signal return indicated by X in the pixels, (λ1, p1), (p1), (λ1, p2), λ0, p3) etc., corresponds to the wavelength of the pulse generated by the transmitter for an FOV slice. In this embodiment, transmitted and received signals have one of the three possible wavelengths λ0, λ1, λ2 at any one time.

FIG. 5B shows the return of FIG. 5A with signals from an interferer indicated by an "I" for the indicated pixels in the detector array. The "I" return is any signal detected by the LiDAR system for signals that were not generated by the LiDAR system. For example, a different autonomous vehicle may have transmitted pulses that were directly or indirectly received by the LiDAR system, which may be part of an autonomous vehicle.

Since the LiDAR system knows, expects, or is programmed when it may receive a certain wavelength in some period of time, which may correspond to a range for LiDAR system, based on what signals were transmitted, the receipt of a signal having a different wavelength in that period of time indicates that the signal was generated by some other system. That is, transmission wavelength coding can be used to discriminate signals from other LiDAR systems.

Figure 5C:
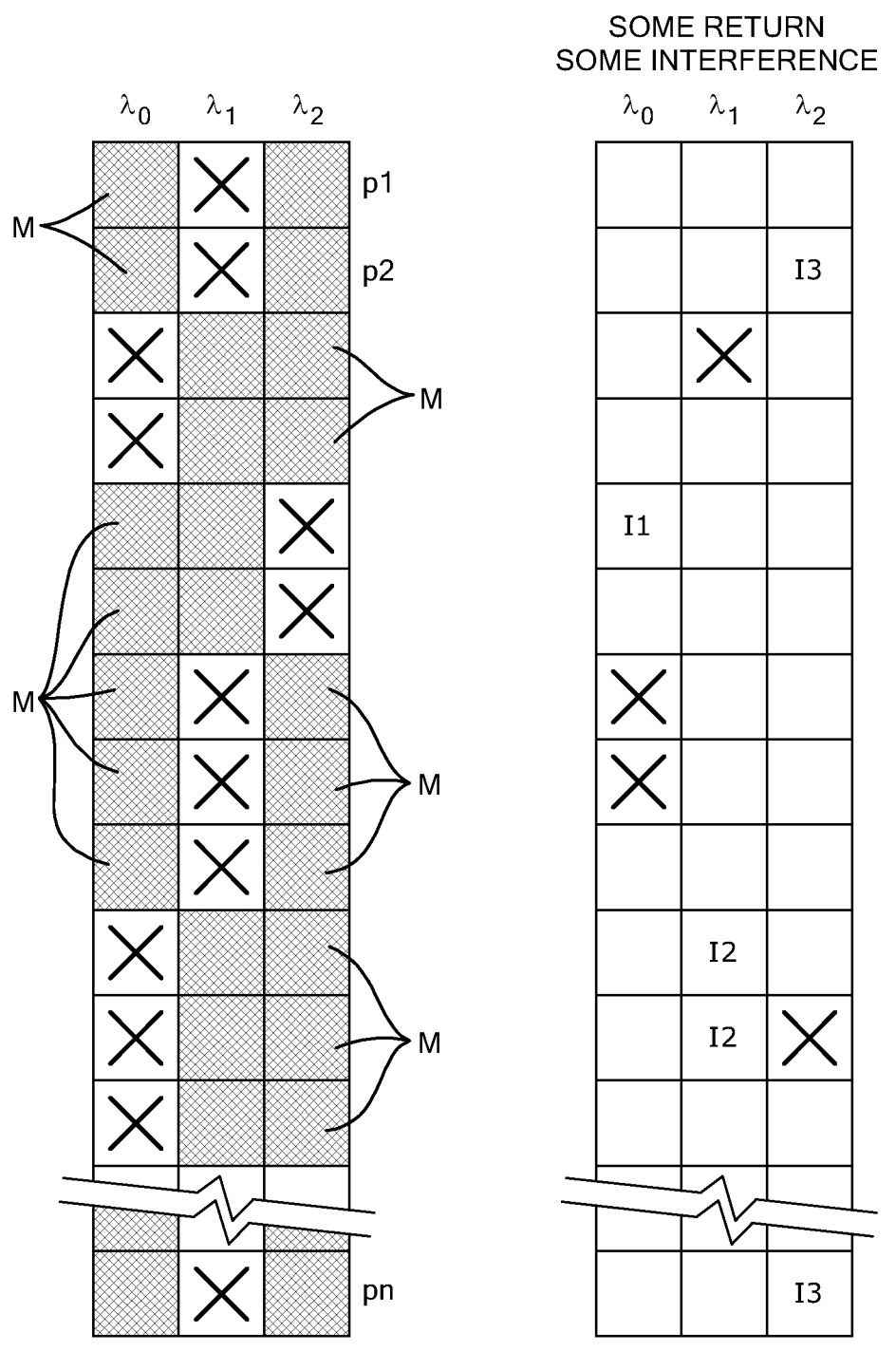

In one embodiment shown in FIG. 5C, the system ignores the interferer return by masking pixels indicated by an "M." It is understood that pixels can be masked electronically using any suitable technique. The masked pixels allow the detector array to have active pixels for expected wavelengths based on signal transmission coding. It is understood that expected means signal return will arrive at given wavelength for the given elevation angle if a target generates the signal return. As will be readily appreciated, safety is enhanced by enabling the LiDAR system to ignore signals from other LiDAR systems. A flag or alert signal may also be generated by the LiDAR system to indicate that a false return or unexpected return was received. This may be ignored, or allow the control system to enter a different mode, such as a safe mode, where a vehicle stops or slows down until the unexpected signal is no longer present.

In an example embodiment shown in FIG. 5D, a detector array may receive signal return at "open" wavelengths as indicated by "X" for certain pixels and signal return from multiple interferes at certain pixels indicated as a first interferer I1, a second interferer I2, and a third interferer I3. The interfering signals I1, I2, I3 can be ignored or processed to meet the needs of a particular application.

In some embodiments, composite laser pulses can be transmitted having multiple wavelengths. Signal return from a target in a LiDAR FOV may contain the multiple wavelengths, each of which can be directed to a particular region of the array. By transmitting pulses having multiple wavelengths, the ability of a LiDAR system discriminate signals from other emitters is enhanced.

Figure 6:
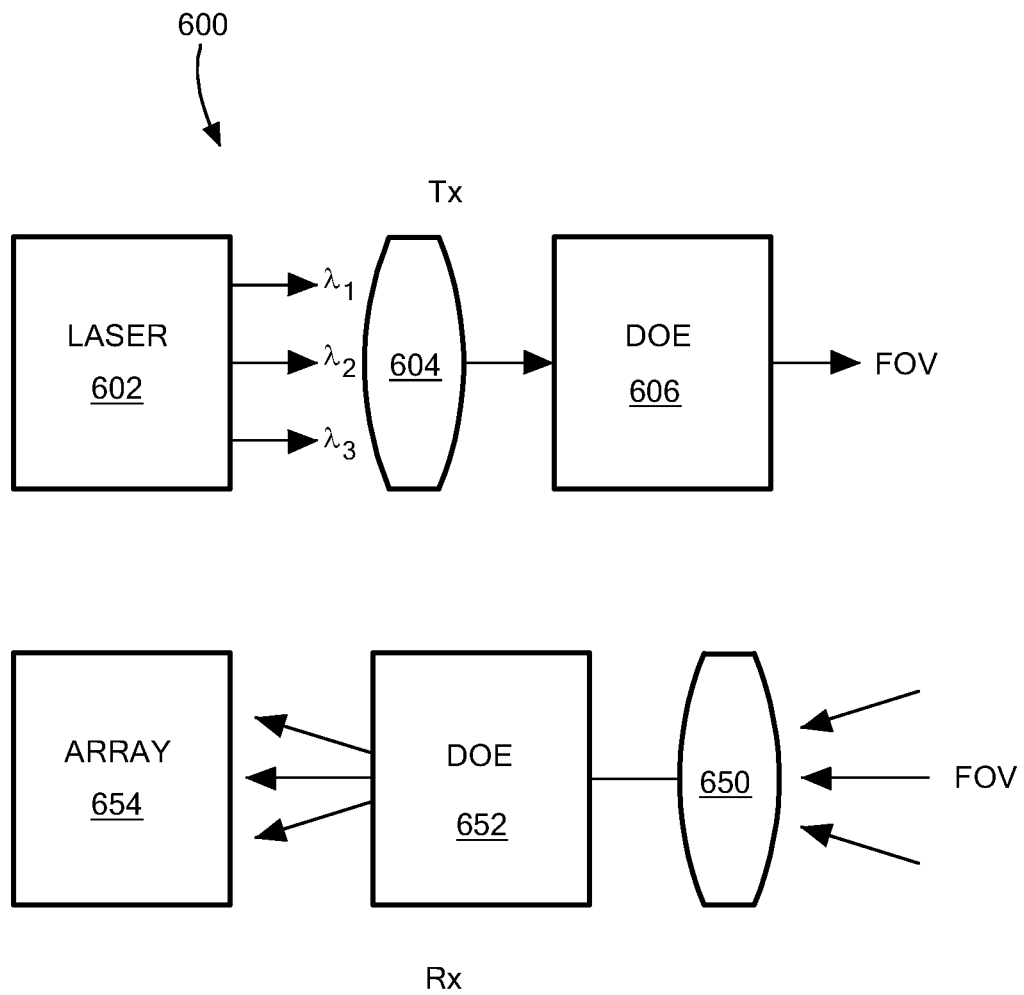
FIG. 6 is a schematic representation of a LiDAR system to transmit and receive multi-wavelength signals.

FIG. 6 shows an example LiDAR system 600 with the transmit and receive paths shown separately for convenience and ease of understanding. A laser module 602 emits pulses that may have multiple wavelengths, such as a center wavelength of 1550 nm and other wavelengths of 1525 and 1575 nm. Any given transmit pulse may contain one, two, or three wavelengths. The transmit path may include a lens 604 to focus light on an optical diffraction optical element 606, such as a diffraction grating, prism, lens, and/or or any combination of these elements, can receive the light from the lens and can be used to combine and collimate the signals. The multi-wavelength signal can illuminate a FOV, as described above.

In some embodiments, the laser module 602 includes a separate laser for each wavelength. In other embodiments, the laser module includes at least one laser for which an output is modulated to generate a multi-wavelength signal from a single laser.

The receive path includes a lens 650, a diffraction optical element 652 such as a diffraction grating, prism, lens, and/or any combination of these elements, and a detector array 654. As described above, and shown below, the diffraction optical element 652 directs the different wavelength signals to different regions of the detector array.

FIG. 7A shows an example coding scheme for signal return having one, two, or three wavelengths where an "X" indicates signal return for the respective wavelength. Since a multi-wavelength signal was transmitted, a multi-wavelength signal is received. That is, signal return may contain multiple wavelengths that can be used to discriminate signals from other emitters, i.e., interferers.

In the illustrated embodiment, the return for array position p1 and p2 contains first and second wavelengths λ0, λ1. Positions p5 and p6 contain all three wavelengths λ0, λ1, λ2. As can be seen, any array position can receive signal return with any combination of the three wavelengths.

As shown in FIG. 7B, signals indicated with an "I" from one or more interferers can be received by pixels in the array. As described above, the LiDAR systems knows what wavelengths were transmitted for a given elevation angle and knows what pixels may receive signal return in a given period of time corresponding to a range for the system. If the signal return for a given time contains a wavelength that was not transmitted, then interfering signals "I" can be detected.

It is understood that any practical number of wavelengths can be contained in a transmit pulse as part of a coding scheme to meet the needs of a particular application. It is further understood that the wavelength composition can be configured based on various parameters. For example, the number of wavelength components and/or coding changes can be increased upon detection of an interferer.

In some embodiments, a vehicle LiDAR system has a unique fixed wavelength coding scheme. In an embodiment, a receiver may receive energy emitted by a vehicle LiDAR system and identify the vehicle based on the unique wavelength coding scheme. In some embodiments, the wavelength coding scheme changes, such as at defined intervals, randomly, and/or by received instruction. In some embodiments, the vehicle changes wavelength coding scheme each time the vehicle is started. In an embodiment a flag or indicator may be output form the LiDAR system to a vehicle controller or vehicle computer and the LiDAR system wavelengths may be reset by the control computer, for example during a time when the engine turns off, as say during a stop sign or red light.

In some embodiments, a vehicle detects an interferer and dynamically changes the wavelength coding scheme. In an embodiment, the vehicle detects a particular interfering wavelength and modifies the wavelength coding scheme to avoid use of the particular interfering wavelength. It is understood that wavelength coding can change in wavelength, elevation angle, number of pulses at the same wavelength, etc., and change randomly or by some predetermined scheme.

In some embodiments, a LiDAR system emits light having frequency and/or amplitude modulation, or other data encoding. An embodiment having multiple types of encoding enables a larger wavelength spacing, such as 1525, 1550, 1575 nm carrier wavelengths with smaller frequency or wavelength changes around those carrier frequencies. Some embodiments can have two types of encoding, or heterogeneous encoding, such as for more demanding ASIL requirements, where ASIL refers to Automotive Safety Integrity Level (ASIL) risk classification scheme defined by the ISO 26262-Functional Safety for Road Vehicles standard. In embodiments, if an expected level of energy is not received by selected pixels, a fault can be flagged to meet the ASIL requirements, for example.

It is understood a variety of components can be used to meet the needs of a particular application. For example, the optical element 406 of FIG. 4 can comprise a diffraction grating, a wavelength selective switch (WSS), and/or other suitable elements to direct wavelengths to a particular location in the detector array. An example WSS is shown and described in W. P. Taylor, J. D. Brazzle, A. Bowman Osenar, C. J. Corcoran, I. H. Jafri, D. Keating, G. Kirkos, M. Lockwood, A. Pareek and J. J. Bernstein, "A High Fill Factor Linear Mirror Array For a Wavelength Selective Switch," *J. Micromechanics and Microengineering*, vol. 14, no. 1, pp. 147-152, January 2004, which is incorporated herein by reference. In addition, U.S. Pat. No. 6,778,728, which is incorporated herein by reference, discloses optical light into a diffraction grating to an array of mirrors. Additional optical steering components are shown and described in W. P. Taylor, J. J. Bernstein, and J. D. Brazzle, "Actuator for Dual-Axis Rotation Micromirror," U.S. Pat. No. 6,760,145, Jul. 6, 2004, and W. P. Taylor and J. J. Bernstein, "Magnetically Actuated Microelectromechanical Devices and Method of Manufacture," U.S. Pat. No. 6,894,823, May 17, 2005, and J. J. Bernstein, W. P. Taylor, John D. Brazzle, C. J. Corcoran, G. Kirkos, J. E. Odhner, A. Pareek, M. Waelti, and M. Zai, "Electromagnetically Actuated Mirror Arrays for use in 3-D Optical Switching Applications," *IEEE J. Microelectromechanical Systems*, vol. 13, no. 3, pp. 526-535, 2004, all of which are incorporated herein by reference.

Figure 8:
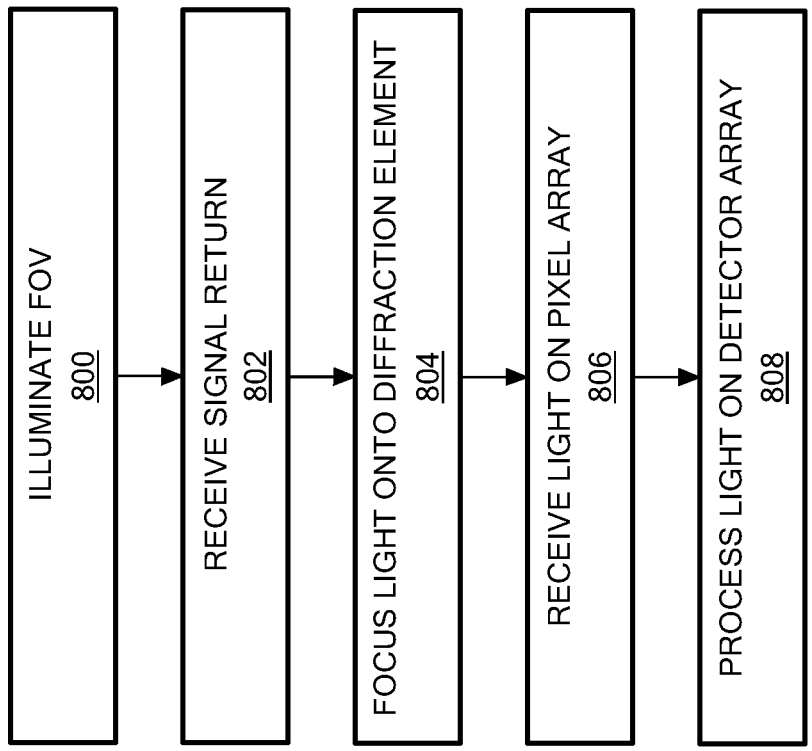
FIG. 8 is a flow diagram of an example sequence of steps for LiDAR scanning a FOV with wavelength discrimination.

FIG. 8 shows an example sequence of steps for discriminating received light in a LiDAR system. In step 800, a FOV is illuminated by a beam of laser pulses at least some of which have different frequencies. In step 802, light energy is received by the LiDAR system. In step 804, the light energy is focused onto diffraction optical element, which may include but is not limited to a diffraction grating or prism, which outputs signals having different wavelengths. In step 806, the diffraction optical element directs the different wavelengths to respective regions of a pixel array. In step 808, outputs from the pixels are processed to generate an image of signal return from light transmitted only from the originating LiDAR system.

Example embodiments of the disclosure provide LiDAR systems that improve performance and mitigate interference in noisy environments. In some embodiments, detection thresholds for pixels may be set based on noise levels. Individual pixels in the detector array can be coded to require less circuitry for ensuring that the received laser energy was originated by the same lidar system.

Figure 9:
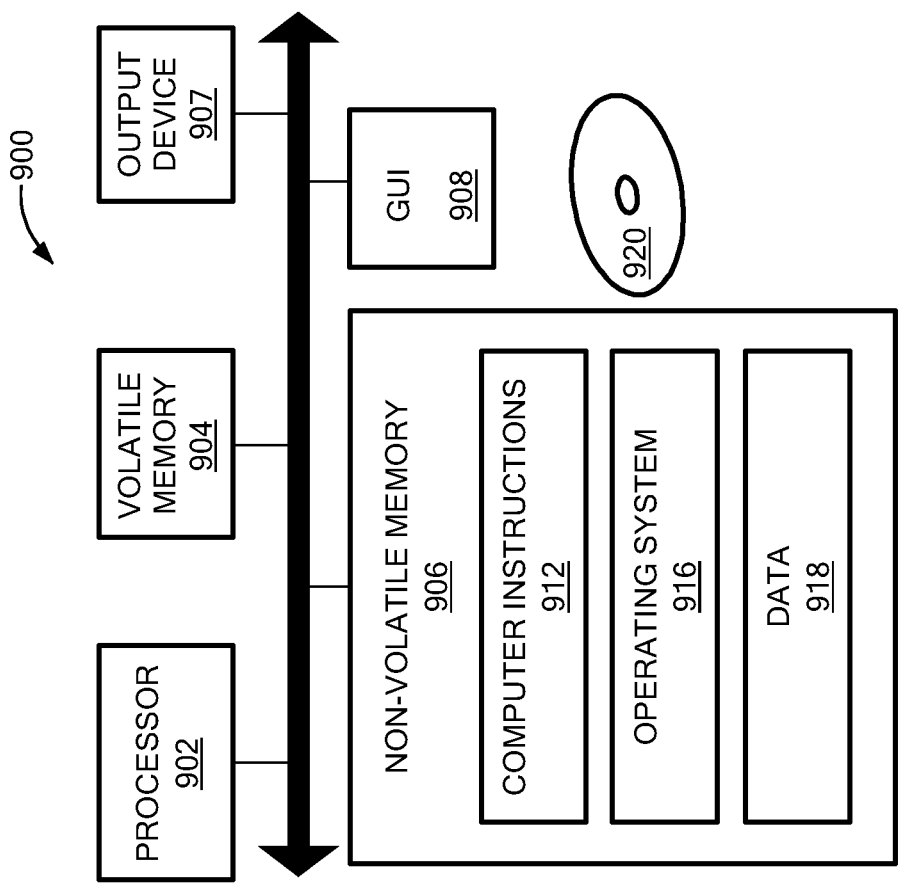
FIG. 9 is a schematic representation of an example computer that can perform at least a portion of the processing described herein.

FIG. 9 shows an exemplary computer 900 that can perform at least part of the processing described herein, such as processing described in FIGS. 5A-D, 7A, 7B, and 8. The computer 900 includes a processor 902, a volatile memory 904, a non-volatile memory 906 (e.g., solid-state RAM, such as flash memory, or MRAM (magnetic random access memory); or hard disk), an output device 907 and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., solid-state memory, flash, MRAM, CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable embedded processors executing one or more computer programs to perform the functions of the system. All or part of the system may be implemented as special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims.

All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   illuminating, by a first LiDAR system, a field of view (FOV) with pulses of transmitted light having different wavelengths at different regions in the FOV;
   focusing incoming light with a lens of the first LiDAR system;
   diffracting the focused light from the lens with a diffraction optical element to generate signals having the different wavelengths to respective regions of a detector array, wherein each pixel position in the array corresponds to one of the different wavelengths and to a spatial location in the FOV; and
   processing data from the pixel array to discriminate any of the incoming light coming from systems other than the first LiDAR system.

2. The method according to claim 1, wherein the different regions of the FOV comprise different elevation angles for a slice of the FOV.

3. The method according to claim 1, wherein the pixel array comprises a w by p two-dimensional array, wherein w is a wavelength index and p is a position index.

4. The method according to claim 1, wherein the diffraction optical element comprises a diffraction grating.

5. The method according to claim 1, wherein the diffraction optical element comprises a wavelength selective switch.

6. The method according to claim 1, wherein a wavelength coding for the transmitted light includes wavelength and time, which corresponds to a range.

7. The method according to claim 1, further including masking pixels in the pixel array for which signal return is not expected based on the wavelength of the transmitted light for a given time.

8. The method according to claim 1, further including receiving light on the pixel array from an interferer.

9. The method according to claim 8, wherein a wavelength coding for the transmitted light includes wavelength and time, and further including modifying the wavelength coding after detecting the interferer.

10. The method according to claim 1, wherein a first one of the different wavelengths comprises 1550 nm.

11. The method according to claim 1, wherein the pulses have a single wavelength.

12. The method according to claim 1, wherein the pulses contain multiple wavelengths.

13. The method according to claim 1, further including employing multiple lasers to generate the different wavelengths.

14. The method according to claim 1, further including modulating the transmitted light with amplitude and/or frequency modulation.

15. The method according to claim 1, further including generating a fault upon failing to receive an expected light at a given position in the pixel array.

16. A system, comprising:
    a first LiDAR system configured to illuminate a field of view (FOV) with pulses of transmitted light having different wavelengths at different regions in the FOV;
    a lens to focus incoming light into the first LiDAR system;
    a diffraction optical element to diffract the focused light from the lens to generate signals having the different wavelengths to respective regions of a detector array, wherein each pixel position in the array corresponds to one of the different wavelengths and to a spatial location in the FOV; and
    a processor to process data from the pixel array to discriminate any of the incoming light coming from systems other than the first LiDAR system.

17. The system according to claim 16, wherein the different regions of the FOV comprise different elevation angles for a slice of the FOV.

18. The system according to claim 16, wherein the pixel array comprises a w by p two-dimensional array, wherein w is a wavelength index and p is a position index.

19. The system according to claim 16, wherein the diffraction optical element comprises a diffraction grating.

20. The system according to claim 16, wherein the diffraction optical element comprises a wavelength selective switch.

21. The system according to claim 16, wherein a wavelength coding for the transmitted light includes wavelength and time, which corresponds to a range.

22. The system according to claim 16, wherein the first LiDAR system is configured to mask pixels in the pixel array for which signal return is not expected based on the wavelength of the transmitted light for a given time.

23. The system according to claim 16, wherein received light on the pixel array is from an interferer.

24. The system according to claim 23, wherein a wavelength coding for the transmitted light includes wavelength and time, and the first LiDAR system is configured to modify the wavelength coding after detecting the interferer.

25. The system according to claim 16, wherein a first one of the different wavelengths comprises 1550 nm.

26. The system according to claim 16, wherein the pulses have a single wavelength.

27. The system according to claim 16, wherein the pulses contain multiple wavelengths.

28. The system according to claim 16, further including multiple lasers to generate the different wavelengths.

29. The system according to claim 16, wherein the first LiDAR system is configured to modulate the transmitted light with amplitude and/or frequency modulation.

30. The system according to claim 16, wherein the first LiDAR system is configured to generate a fault upon failing to receive an expected light at a given position in the pixel array.

* * * * *

UNITED STATES PATENT AND TRADEMARK OFFICE
CERTIFICATE OF CORRECTION

PATENT NO. : 12,140,702 B1
APPLICATION NO. : 18/465296
DATED : November 12, 2024
INVENTOR(S) : William P. Taylor It is certified that error appears in the above-identified patent and that said Letters Patent is hereby corrected as shown below:

In the Specification

Column 1, Line 7, delete "LIDAR" and replace with --LiDAR--.
Column 6, Line 14, delete "examplecompared" and replace with --example, compared--.
Column 8, Line 5, delete "AO-n" and replace with --$\lambda$O-n--.
Column 8, Line 9, delete "AO-n" and replace with --$\lambda$O-n--.
Column 8, Line 14, delete "AO-n)," and replace with --$\lambda$O-n),--.
Column 11, Line 45, delete "Pareck" and replace with --Pareek--.

Signed and Sealed this
Third Day of June, 2025

Coke Morgan Stewart
*Acting Director of the United States Patent and Trademark Office*